United States Patent [19]

Sinclair

[11] Patent Number: 5,187,661

[45] Date of Patent: Feb. 16, 1993

[54] METHOD OF DETERMINING INVADED FORMATION PROPERTIES INCLUDING RESISTIVITY DIELECTRIC CONSTANT AND ZONE DIAMETER

[75] Inventor: Paul I. Sinclair, Clear Lake Shores, Tex.

[73] Assignee: Halliburton Logging Services, Inc., Houston, Tex.

[21] Appl. No.: 382,591

[22] Filed: Jul. 21, 1989

[51] Int. Cl.⁵ .......................... G01V 3/18; G01V 3/38
[52] U.S. Cl. .................................... 364/422; 324/339; 324/341
[58] Field of Search ................. 364/422; 324/339, 341

[56]  References Cited

U.S. PATENT DOCUMENTS

4,360,778 11/1982 Freedman ........................... 324/339
4,654,598 3/1987 Arulanandan et al. ............. 324/354
4,730,161 3/1988 Cox et al. ........................ 324/341 X
4,849,699 7/1989 Gill et al. ........................... 324/339

Primary Examiner—Roy N. Envall, Jr.
Assistant Examiner—A. Bodendorf
Attorney, Agent, or Firm—William J. Beard

[57]  ABSTRACT

An apparatus and method for induction logging is disclosed. By transmitting a sequence of pulses at many frequencies, the formation invaded zone diameter can be distinguished as a result of changes in resistivity. As higher frequencies are swept, dielectric constant varies with frequency and this variation is evident in chart form. An apparatus for controlled antenna field formation is also disclosed.

10 Claims, 6 Drawing Sheets

FREQ.= 2.5MHz, Rt=100, Rxo=1, Kt=10, Kxo=10

METHOD OF DETERMINING INVADED FORMATION PROPERTIES INCLUDING RESISTIVITY DIELECTRIC CONSTANT AND ZONE DIAMETER

BACKGROUND OF THE DISCLOSURE

Induction logging tools propagate a signal through strata adjacent to a well borehole to determine measurements relating to the rock formations making up the strata. Particularly important measurements are directed to bulk resistivity and the dielectric constant of the material. These measurements of the rock making up the formations indicate the presence of hydrocarbons found in the pore spaces of the rock formations. In particular, the present invention applies to the special case where the bulk resistivity alone is inadequate to determine in situ hydrocarbon saturation. This occurs when the connate waters in a given region are known to be very pure and have high resistivity, and are thus not readily distinguishable from non-conductive hydrocarbons. Investigating the dielectric properties where water has a dielectric constant at least twenty times that of hydrocarbons is involved. When a well is drilled, conventional drilling techniques involve the use of drilling mud which invades the formations and which may change the measurements. Conventional drilling techniques involve delivery of a continuous stream of drilling mud through the drill stem which flows upwardly in the annular space surrounding the drill pipe. The drilling fluid is made of two major components, one being a weight material, usually barite, and the other is water. As the well progresses in depth, ambient pressure within the unaltered formation is potentially interrupted by the borehole formed through the formation. It is possible that the fluid otherwise held in the formation at ambient pressures will escape into the borehole. To counter this, the column of drilling fluid in the borehole is maintained at a specified pressure to prevent discharge up through the borehole. If that were to occur, a "blowout" might well happen. The ambient pressure is thus counter balanced and slightly exceeded in optimum conditions by the pressure of the drilling fluid. That pressure is determined by two factors which are primarily the height of the column of drilling fluid in the borehole and the density of that fluid.

This positive pressure applied in the drilling column provides fluid drive forcing a portion of the drilling mud into the adjacent formations and the rock formations are invaded at least to some measure. The solvent will typically penetrate further into the formation than the solid components, thereby forming a mud cake on the sidewall of the borehole. Generally, this is desirable to protect the borehole. The depth of penetration of the drilling mud solvent however is variable and has a substantial impact on formation characteristics as a result of the invasion.

The penetration of the drilling fluid solvent is dependent on many factors including the nature of the rock formation, the pressure differential, the thickness of the mud cake, the wettability of the formation to the hydrocarbons and to the water based drilling fluids, and many other factors which are too complex to readily quantify. Thus, when an inductive measurement is made, the data obtained is substantially dependent on the depth of invasion into the formation. The present procedure enables determination of the depth of invasion, hence resistivity and dielectric measurements can be isolated for the unaltered formation, while the region which has been penetrated by the drilling fluid can also be separately evaluated.

The response of the formation is partially dependent on the frequency used to obtain the induction measurements. Heretofore, conflicting factors have forced a compromise in such measurements. The frequency ideally is sufficiently high to provide a measurable phase shift in response to dielectric constant changes. The frequency is ideally low enough to avoid skin effect limitations on the depth of investigation. Literature regarding this has described a generally acceptable frequency range of about 16 to about 200 Megahertz. The present system is directed to a plurality of measurement which are made at plural frequencies. It has been determined that the frequency range useful for accurate dielectric measurements accomplished with relatively deep inductive penetration into the formation is in the range of about 10 to about 200 megahertz. Such measurements are unreliable until the invaded zone resistivity measurement can be determined and separated from the data. By contrast to the range mentioned above, relatively low frequencies are preferred to obtain an appropriate phase shift in measuring the resistivity. This range is about 1 to about 10 megahertz. This is an entirely different range than the range involved in dielectric constant measurements. As set forth in greater detail, a plurality of measurements at selected frequencies is used to obtained different readings. This helps isolate the invaded zone so that the constrast in resistivity measurements can be found. If the resistivity contrast defining the invaded zone can be determined, then measurements become more meaningful so that the actual resistivity of the rock can be measured. Once that is known, higher frequency induction measurements are used to determine the dielectric constant.

The present approach thus involves sweeping the logging tool transmitters through a range of frequencies. The low frequencies are used in resistivity measurements, and in particular to locate the invaded zone. This enables the bulk resistivity of the rock to be isolated. That value is helpful in the remaining sequence. The sequence involves high frequency measurements which are useful in dielectric constant evaluation. Several measurements are made at higher frequencies, and that data will yield measured phase shift and attenuation. This data enables determination of the dielectric constant of the formation, and in particular, dielectric constant without invasion of the drilling fluid.

The present apparatus is thus summarized as a logging system having multiple transmitters and receivers along a sonde. These are pulsed at selected frequencies. The frequencies sweep across the low frequency range to assist in resistivity measurements and then across the high frequency range to obtain data useful in dielectric constant measurements. This requires the sonde to support a number of antenna elements where the several antennas must have a specified radiation pattern. For a formation of sufficient thickness to be resolved by the present procedure, the antenna propagation pattern must be considered.

First, notice should be taken of the context in which the antennas are placed in the borehole. They are mounted in an elongate sonde typically supported by a elongate cylindrical housing and typically having an elongate cylindrical mandrel therein. This in turn is located in an elongate cylindrical hole in a formation which has a interface at the borehole with or without borehole fluid invasion. Ideally, all of this has a common central axis. It is desirable that the electromagnetic energy traveling from transmitter to receiver have the form of a substantially planar wave traveling parallel to the axis of the borehole.

In a practical sense, parasitic electric fields are something of a problem. In part, this derives from the installation of multiple antennas on the mandrel making up the sonde. In part, this involves the coaxial transmission line which is defined by the mandrel surrounded by borehole fluids, the outer wall of the borehole, and the more remote surrounding formation defined by the invaded zone in the formation. The magnetic field of this defined coaxial line is orthogonally positioned to the desired propagation mode. It forms a wave traveling with a difference velocity and subject to different attenuation characteristics.

The desired wave in a perfect system involves an azimuthal electric field with a magnetic field at right angles, while the parasitic system has the magnetic field in the azimuthal direction and the electric field in the axial direction. The foregoing describes the unwanted transmitted signal; clearly, the receiving antenna may respond to it and thereby form an erroneous signal component.

The foregoing describes the problem somewhat simplistically; in fact, the installed antennas on the sonde (including the geometry of the sonde) positioned in the borehole prevents direct data separation; that is, the response in the unwanted mode is sufficiently significant and yet significantly complex that it cannot be sorted from the desired data and it is therefore very helpful to supress this unwanted signal mode.

Keeping in view that the antenna system must operate in the approximate range of about 1 to about 200 megahertz, the present disclosure is directed to an antenna system known as the shielded loop system. That is, it is formed of shielded conductors of the sort typically used in a transmission line. Multiple turns are configured so that the shielded coaxial cable eliminates any external electric dipole from being formed along the axis of a multiple turn coil shaped like a solenoid. All the turns are connected to the same potential by a shorting bar parallel to the axis of the coil. Multiple turns in the solenoid coil improve antenna gain while the band width of the antenna is determined primarily by the single turn inductance loaded by the transmission line characteristics impedance. If high impedance coaxial cable is used, the upper frequency limit of the antenna system is increased. This provides an induction coil coupled to a transmission line. While the foregoing described the transmitter antenna, an identical receiving antenna may be utilized, all subject to the principal of reciprocity.

While the foregoing speaks of a single transmitter antenna and a reciprocally defined receiver antenna, the present system contemplates the use of several antennas within the sonde which are all supported by a central mandrel through the sonde. The shorting bar mentioned above in the multiple turn shielded loop antenna. A solenoid coil provides a uniform mean surface potential. Two or more such solenoid coils can be used if they are attached to a common metallic mandrel which provides zero potential coupling. The mandrel supports all of the coils (more than two in the preferred embodiment) and thus the mandrel is involved in the shorting bar construction. By defining sets of transmitting and receiving antennas and locating them at various points along the mandrel, all undesirable interaction along the length of the sonde is eliminated. In this regard, the central metal member defining the mandrel may be used to support the plural antenna elements with spaced resistance material disks extending outwardly from the mandrel and which contact the tubular sleeve or housing which defines the sonde. That housing of course is in electrical contact with the surrounding borehole fluid. Transverse resistive disks thus extending from the central mandrel and contacting the surrounding resistive tubular sleeve or housing markedly decreases parasitically induced current flow resulting from the coaxial transmission line implemented by the central mandrel. A resistive housing is obtained by a composite plastic material such as an epoxy impregnated, glass fiber wrapped housing provided with sufficient fibers of conductive carbon or graphite or otherwise provided with conductive carbon particles in the epoxy. The composite material housing is made with a selected electrical conductivity to thereby avoid or at least substantially reduce the parasitically induced, undesirable currents in a way that is essential to a practical tool. Some of the transverse resistive discs may be replaced with highly conductive metal discs where appropriate to provide enhanced suppression of parasitic currents that may flow in the central mandrel. The housing may also incorporate conductive fibers that are oriented to enhance the electric field shielding of coils while not interfering with the desired magnetic field coupling of the coils.

In the preferred embodiment, there will typically be six antenna elements arranged at specified lengths along the structure of the tool and these will therefore operate quite successfully when installed on a mandrel in a housing as described with resistive transverse elements spaced along the length of the housing in the described fashion. This defines a multifrequency dielectric logging tool which operates at a wide frequency range, typically up to about 200 megahertz, which is pulsed periodically at selected frequencies and which provides the data described above. While some suggestion has been made above of the preferred embodiment, the detailed description which is set below will provide description of the tool of the present disclosure and will further provide a basis for a detailed explanation for its construction and operation. An appropriate, the underlying theory relating to its operation will also be given.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typically embodiments of this invention and are therefore not to be considered limiting of its scope, for the invention may admit to other equally effective embodiments.

DETAILED DESCRIPTION OF THE PREFERRED EMBODIMENT

Figures 1, 5:
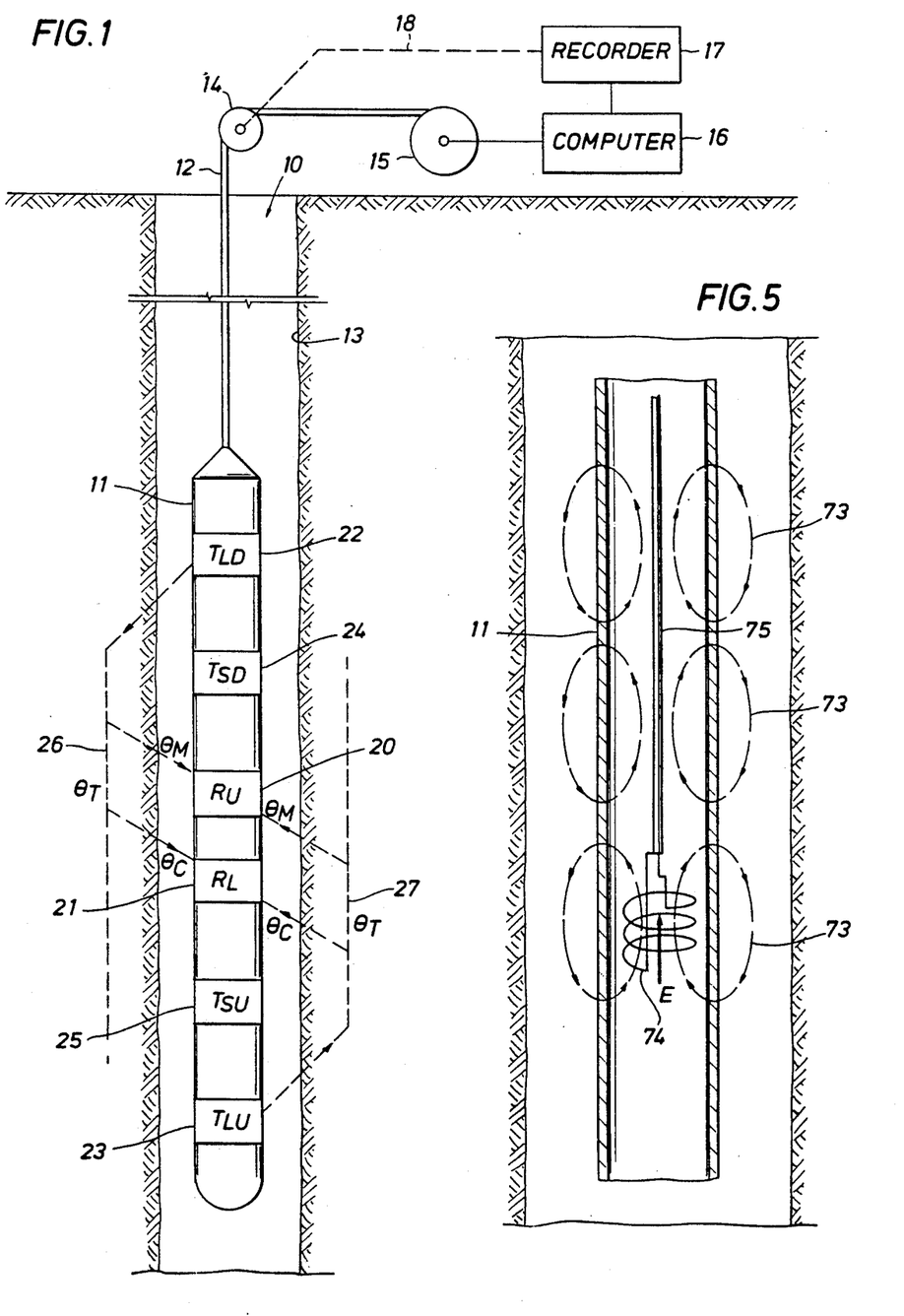
FIG. 1 shows a sonde supported in a well borehole for conducting logging operations in accordance with the present disclosure and wherein the antennas located along the sonde are involved in transmission of signals along the idealized ray paths.
FIG. 5 is a paarasitic electric field formed along the sonde which creates certain undesirable field currents.
Figure 2:
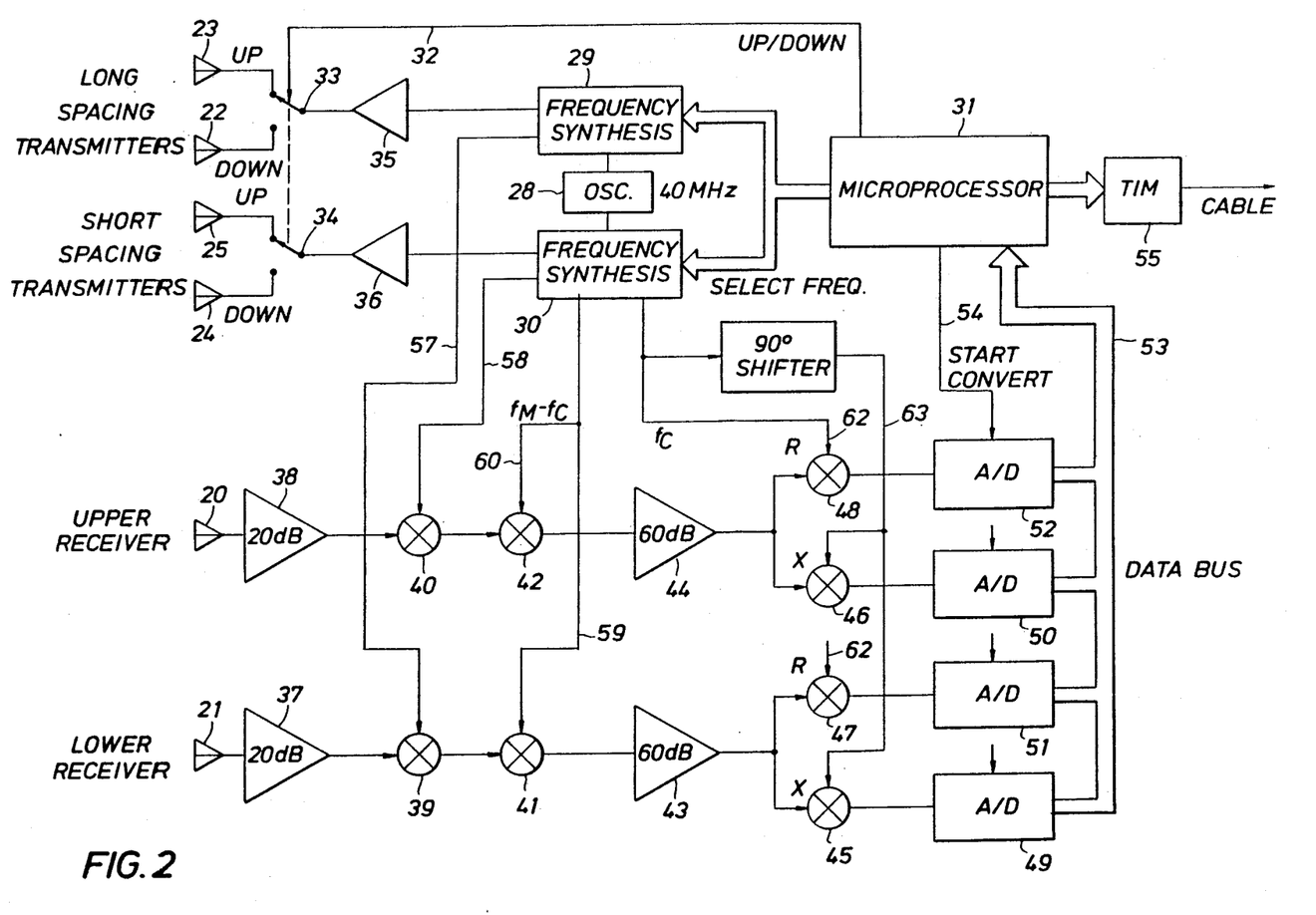
FIG. 2 is schematic block diagram of the logging instrument of the present disclosure and in particular shows an oscillator operated in conjunction with a harmonic selection system to provide output pulses at different frequencies over a wide range.

Attention is now directed jointly to FIGS. 1 and 2 which show a sonde supported logging tool in accordance with the present disclosure. The logging tool is constructed with the circuitry shown in FIG. 2 incorporated in the tool. The sonde has the several antennas defined in FIG. 1. The sonde is thus indicated by the numeral 10 and is defined by a surrounding outer housing 11 which is supported on a logging cable 12. The logging cable enables retrieval of the sonde as it is pulled upwardly in an open borehole, that is, a well that has been uncased. The borehole is identified by the numeral 13. The logging cable 12 passes over a sheave 14 and is stored in multiple turns on a drum 15. The logging cable is connected by various conductors extending through the cable from the sonde 11 to data processing equipment 16 and the data is output to a recorder 17. This sheave is connected with a mechanical or electrical depth measuring system 18 and provides measurements to the recorder 17 so that the data obtained from the logging sequence is recorded as a function of depth in the well borehole.

Details relating to construction of the several antennas will be given later. It is sufficient for present purposes to describe the antenna system by referencing six antennas. There are two receiving antennas and four transmitting antennas. All six antennas are contructed in the same fashion and have the form of solenoid coils supported on a mandrel common to all the antennas. More will be noted regarding that hereinafter. Of importance at this juncture is the fact that the system includes receiver antennas 20 and 21 which are spaced from one another to thereby define a mid-point between the two antennas which is the symmetrical mid-point. That is, the antennas positioned above the mid-point provide a mirror image to the antennas below that point. In that sense, the antennas 20 and 21 are said to be equally spaced from the mid-point. One acceptable measurement is five inches each from the mid-point, or a total span of 10 inches between the antennas 20 and 21.

There are long spaced transmitter coils. The uppermost antenna coil is identified at 22 while the counterpart below is identified at 23. The short spaced transmitter coils are likewise identified at 24 and 25 respectively.

There is a first ray path downwardly identified at 26. This ray path is similar to the ray path 27 on the opposite side of the drawing. As will be understood, FIG. 1 is an idealized representation. The sidewall defined by the borehole may be irregular. There will be irregularities in the sidewall, and it is therefore desirable to incorporate a dual transmission system to reduce the errors resulting from irregularities in sidewall shape. The ray path 26 involves transmission from the transmitter coil 22. The path is ideally represented as extending downwardly from that coil along the path 26 so that the transmitted signal is received at both receiver coils or 20 and 21. The path from the lowermost transmitter coil 23 is upwardly and parallel to the borehole in like fashion. The two radiation paths provide signals to the spaced receivers. Importantly, the ray paths 26 and 27 are through a formation to be tested and measured. By providing two measurements where one is transmitted downwardly and the other upwardly, two values can be obtained so that irregularities in geometry of the borehole can be reduced by averaging. The short transmitter antennas are 30" and the long antennas are 70" from the midpoint in the preferred embodiment.

Figures 6, 7:
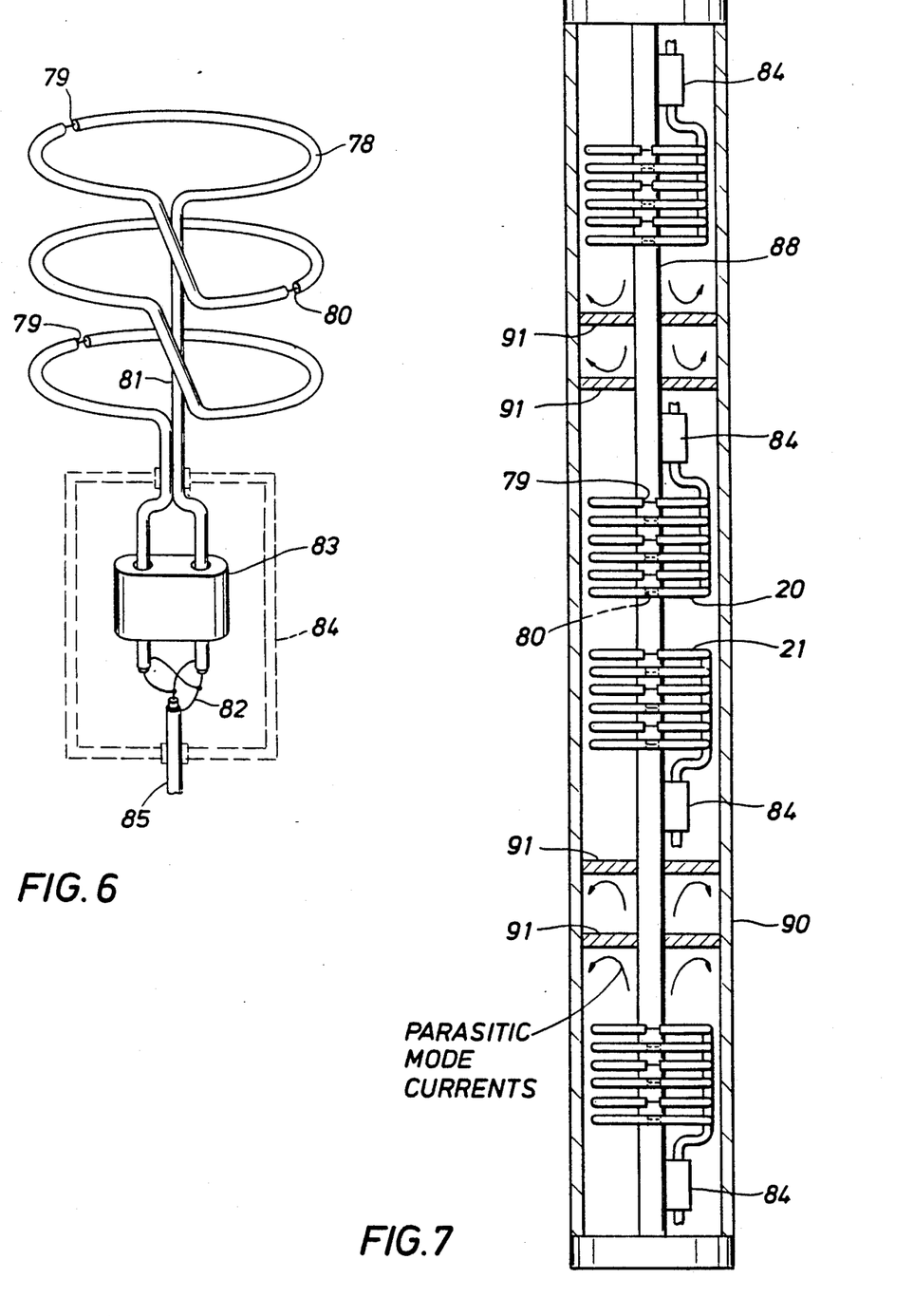
FIG. 6 is a shielded multiple turn antenna featuring coil turns of planar nature, a grounding strap from turn to turn and having a balun connection.
FIG. 7 shows plural antenna coils arranged along the supporting mandrel and located within the resistive material housing and further showing spaced resistive disks between antennas to suppress unwanted electric fields.

The six antennas deployed along the sonde shown in FIG. 1 are again shown in FIG. 6 of the drawings. The cooperative transmitting and receiving system is also shown. This system includes a fixed frequency oscillator 28 which is operated at a specific frequency as described below. It forms an output for frequency synthesizer circuits 29 and 30. These circuits are preferably identical in construction and operate at different frequencies subject to the control described below. A microprocessor control circuit 31 provides timing signals which initiate frequency synthesis. That circuit also provides control for switching between transmission upwardly and downwardly. Those signals are output on a conductor 32 and operate the switches 33 and 34. The synthesized signals are output from the circuits 29 and 30 through the respective power amplifiers 35 and 36. The receivers 20 and 21 are provided with appropriate amplifiers 37 and 38. These in turn connect to signal mixers 39 and 40. The mixers are provided with signals from the appropriate synthesizers 29 and 30. These form output signals which represents the difference signals. The signals thus from the receivers 20 and 21 are additionally processed. They are supplied through the first mixers 39 and 40, and are then supplied to additional mixers 41 and 42. The two respective signals are input to amplifiers 43 and 44. The two amplifiers form outputs which are provided to two mixers for each amplifier. These are the mixers 45-48 inclusive connected in the illustrated fashion. The outputs of these four mixers are then provided to four duplicate analog to digital converters 49-52 inclusive and they form digital words which are output for a data bus 53 supplied to the micro processor 31. Timing signals are provided for the ADC's 49-52 on the conductor 54. The data words transferred after digital conversion through the micro processor 31 are then output to the telemetry system 55 and delivered up the logging cable to the surface.

QUADRATURE SIGNAL SEPARATION

The two receivers provide two separate inputs which are processed in like fashion, and hence a description of one will suffice for the other. Moreover, there is a sequence in which the received signal is altered in frequency by the injected signals at the three stages of mixers. Very briefly, the purpose of the mixing sequence shown in FIG. 2 is to obtain signals which can be readily divided into quadrature components so that the resistive nd reactive components can be isolated. To this end, a first frequency which is $F_r$ is provided on the conductors 57 and 58 which are output from the frequency synthesizers 29 and 30. The frequency $F_r$ will be explained below. The subtracted signal obtained from the mixers 39 nd 40 is $F_m$, discussed below. The frequency synthesizer circuits also provide another signal on the conductors 59 and 60 and that signal is at a frequency of $(F_m - F_c)$. The subtraction of the injected signal yields $F_c$ output in the two amplifier channels and that is amplified by the amplifiers 43 and 44. An $F_c$ signal is generated (described below) and is provided on the conductor 62. That is input to the phase-sensitive detectors 47 and 48. In addition, the signal is directed to a 90 degree phase shifter and output on the conductor 63 for the phase-sensitive detectors 45 and 46.

Both channels are provided with duplicate detectors which are driven by $F_c$, in one instance without phase shift, and in the other instance with 90 degrees phase shift. The four detectors provide the two received signals which are broken down into resolved vector components i.e. the resistive and reactive components. This quadrature signal information is output, providing data which can be graphed to obtain the relationships which will be discussed herein below and which are exemplified in selected graphical relationships incorporated with the present disclosure. Moreover, that leads to the proper analysis of the cylindrical zone around the borehole which is invaded by drilling fluid, and which will be discussed in isolation of the formation resistivity and dielectric constant.

EXEMPLARY FREQUENCIES, SIGNAL SEQUENCE, AND DATA COLLECTION

Recalling the background of the present disclosure, it is noted that there is a formation frequency preference which can be exploited by the disclosed apparatus. Thus, the preferred embodiment utilizes the exemplary frequency pulse routine described below. Assume for purposes of illustration that the logging tool is raised in the borehole at the velocity of 60 feet per minute, an exemplary value chosen for ease of calculation. In other words, it moves one foot per second. Assume further that a pulse train is formed and is output utilizing control of the oscillator 22. The oscillator in fact can be a relatively simple quartz controlled oscillator, or perhaps a phase lock loop system for forming the desired frequency. Frequencies are chosen so that they are multiples of two and therefore digital circuitry can be readily implemented to switch from one frequency to the next through the use of binary dividers well known in the art. In any event, certain frequencies are important between the range of about 1 to 10 megahertz, while other data is obtained in the range of about 10 to 200 megahertz.

Based on the foregoing, the oscillator 28 is operated at a specific frequency and through the use of well known binary flip-flop dividers, multiple frequency outputs can be obtained. As an example, if the oscillator is operated at 10 megahertz, that frequency can be divided down to provide outputs at 5 megahertz, 2.5 megahertz, 1.25 megahertz, 0.625 megahertz, etc. while it can be multiplied up to provide frequencies of 20, 40 and 80 megahertz. The foregoing frequencies represent conveniently chosen, readily achieved frequencies which are scattered across the frequency band of 1 to 200 megahertz. These representative frequencies having multiples of two are conveniently and easily achieved and therefore represent the preferred operating frequencies. A phase-locked loop may additionally be employed to generate a wider range of frequencies or more closely spaced frequencies.

Recalling as noted above an exemplary velocity upwardly in the borehole of 1 foot per second, if as many as 10 frequencies are used and each is pulsed for an interval of 4 milliseconds and the system is switched off for an interval of 1 millisecond, 5 milliseconds would be required for each frequency or 50 milliseconds for all 10 frequencies. Even if this 10 frequency sequence required as long as 200 milliseconds, or 0.2 seconds, the tool would only move 2.4 inches or a sufficiently small distance that the tool can be effectively treated as stationary during its operation. That is to say, there is no undesirable impact resulting from movement of the tool. The tool is effectively measuring the same volume of the rock formation during the interval that the several pulses are transmitted at the selected frequencies. Generally, the tool can be switched off for a period of time and thereafter switched on to provide another set of different frequency impulses transmitted into the formations adjacent to the borehole, to allow for various circuit elements such as filters to settle to new measurement values.

If need be, a first set of pulses can be transmitted using the long transmitters, and then using the short transmitters. Recall that there are two long transmitters, and two that are much closer. The long transmitters are driven by the amplifier 35 which provides an output much larger than the short spaced transmitters antennas. That is, the amplifier 35 provides an output which is approximately 100 times greater than the output of the amplifier 36, to compensate for greater signal attenuation over the greater distance between antennas.

A typical sequence of operation is to provide a first pulse through the amplifier 35 which is transmitted from one of the two antennas 22 and 23. Even if 10 consecutive pulses are transmitted with the timing and spacing mentioned above and then the switch 33 is operated to provided another sequence of 10 pulses, for practical purposes, the logging tool does not move in that short interval of time. If several milliseconds are permitted to pass to enable the switch 33 to settle after operation, there is still substantially no movement to the extent that it relocates the antenna system relative to the formation. Going back to FIG. 1, this shows the idealized ray paths to the two receivers, and thus potential irregularities in the wall of the borehole are overcome by averaging data obtained from the two ray paths, one involving transmission upwardly and the other involving transmission downwardly.

Consider one sequence of operations where the pulse transmitted is at 80 megahertz. In that instance, the transmitted frequency is 80 megahertz, and the received frequency again is 80 megahertz. Note however processing of that signal by utilizing the three mixers provided with three separate frequency signals. The first mixers is provided with a signal at the frequency of 79.500 megahertz, the second is provided with the frequency of 480 kilohertz, and the third mixer (which operates here as a phase-sensitive detector because both input frequencies are the same) is provided with the frequency of 20 kilohertz. As to the latter, this occurs at two phase-sensitive detectors which differ by the 90 degrees phase shift mentioned and hence resistive and reactive signals are output which can then be used in the further processing as described below. It will be obvious to those trained in the art that the method of "double conversion" described may be simplified where component performance warrants with a more simple "single conversion" method wherein the second mixer is eliminated from each receiver.

RELATIONSHIP OF PHASE SHIFT AND RESISTIVITY

Figure 3:
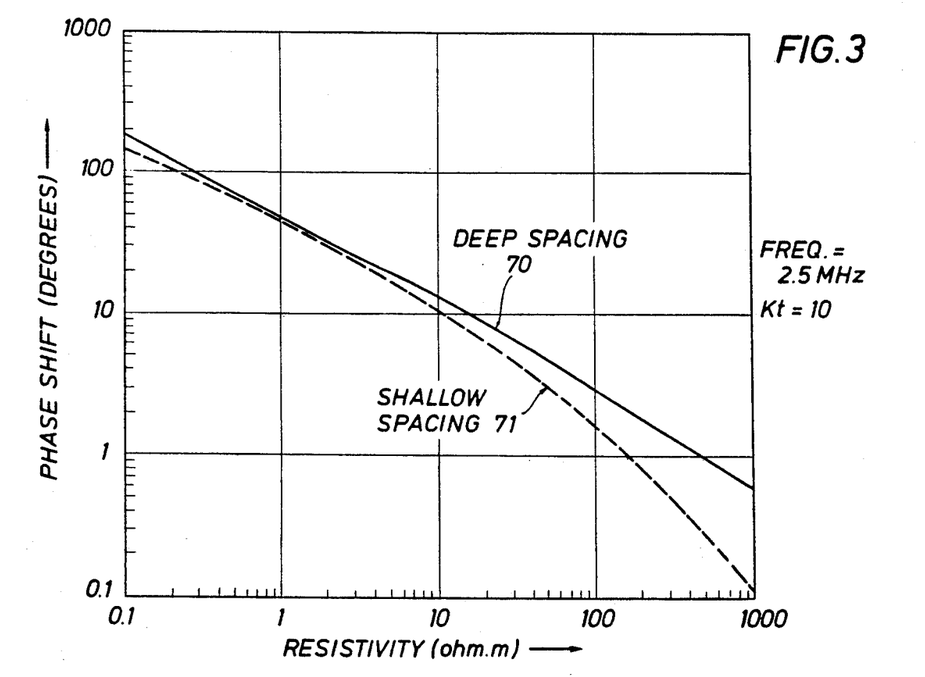
FIG. 3 is a plot of phase shift as a function of frequency and further shows separate curves for different spacing between antenna elements.

FIG. 3 of the drawings includes curves 70 and 71. They show phase shift in degrees as a function of resistivity. This is for formation materials having a relative dielectric of 10, and was measured at a frequency of 2.5 megahertz. The curve 70 is associated with the long spaced transmitter coils. The curve 71 is associated with the short spaced transmitter coils. Recall that the four transmitter coils are spaced either at 70 inches or 30 inches from the midpoint on the sonde.

Assume that FIG. 3 is data obtained for a frequency of 2.5 megahertz. Low frequency measurements can be combined in a manner well known to log analyst as a tornado chart method to determine the diameter of the invaded zone. It also enables location of the contrast in resistivity and hence, can obtain the two measurements of resistivity, that is, the resistivity of the undisturbed portion and the resistivity of that portion which has been invaded by the drilling fluid. The resistivity contrast can easily be as much as 10 to 100 times. Accordingly, this approach is used to determine the location of the invaded zone, the line of demarcation between the invaded formation and the uninvaded formation, and the measurements of actual resistivity on both sides of that. This typically is accomplished at the low frequency range, between 1 to 5 megahertz but preferably 2.5 megahertz or lower in frequency depending on the range of rock formation resistivities encountered in any given location.

Figure 4:
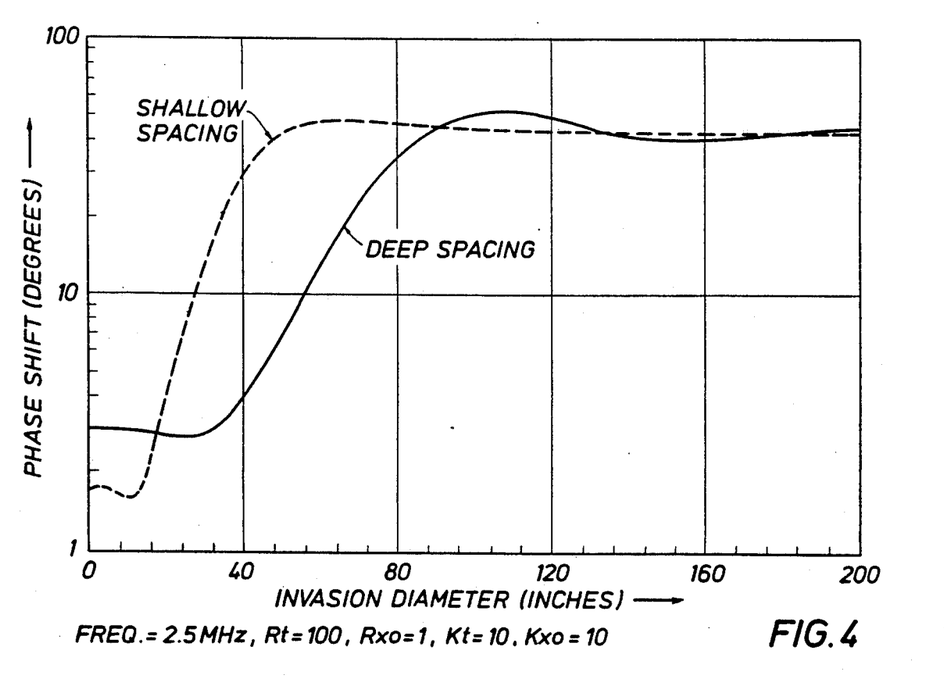
FIG. 4 is a plot showing phase shift for different diameter drilling fluid invasion zones in the formation.
Figure 8:
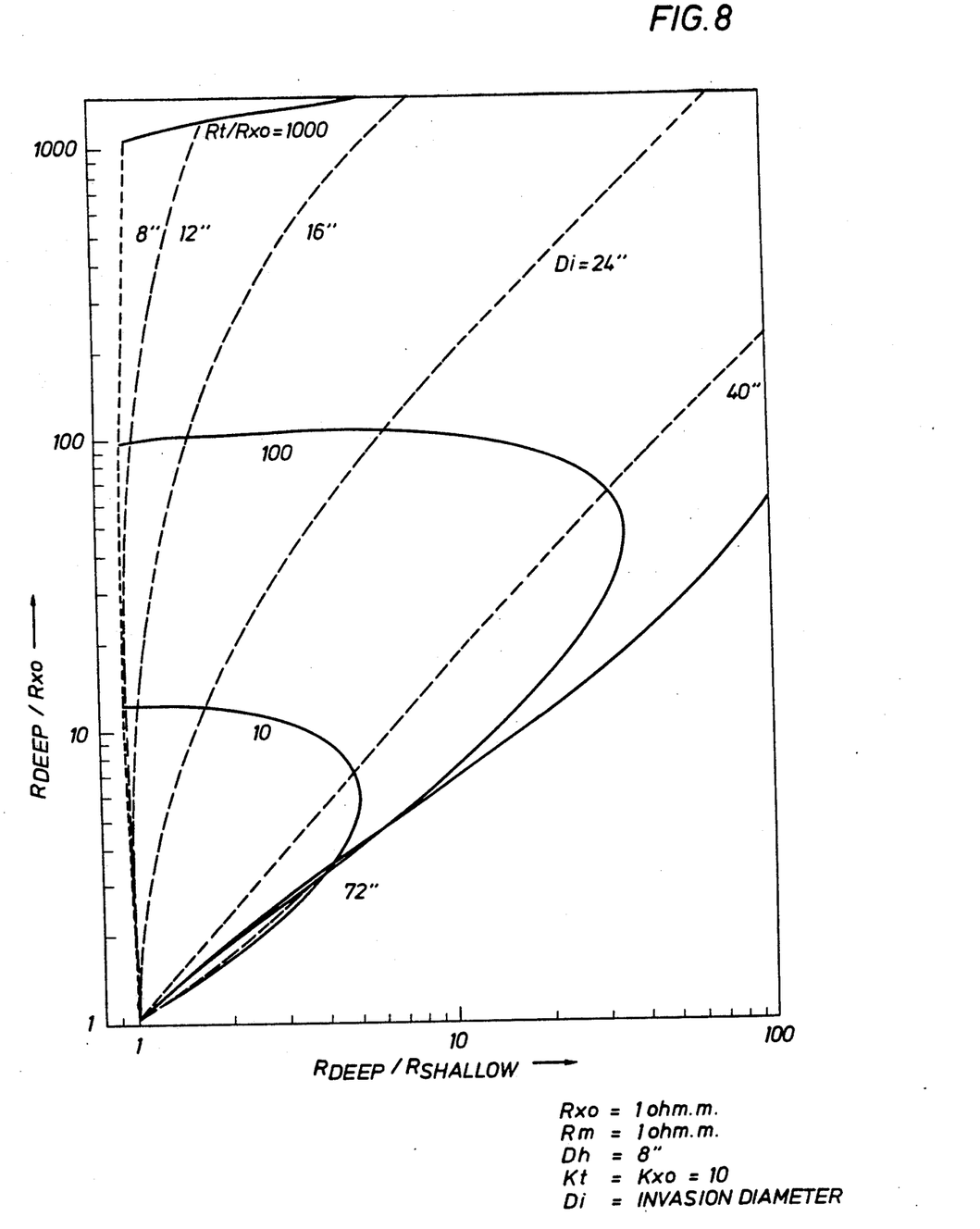
FIG. 8 shows a tornado chart for interpreting invasion.

FIG. 4 is a graph showing differences in phase shift as a function of the diameter of the invaded zone. In a formation where the resistivity is 100 ohm-meters, and the resistivity after invasion is 1 ohm-meters, FIG. 4 shows a graph of phase shift as a function of various diameters of the invaded zone, and for both the long-spaced transmitters ("deep" curve) and the short-spaced transmitters ("shallow" curve). Use of data from FIG. 3 and FIG. 4 may be combined and used to interpret the apparent resistivity for the deep and shallow measurements. FIG. 8 shows an example "tornado chart" of which there may be several used in conjunction with the present invention. By the use of suitable calibration constants, and by selection of constants relating to a variety of different oil bearing formations and water bearing formations, curves such as that shown in FIG. 8 can be used in a meaningful fashion to determine the diameter of the invaded zone and the true resistivity of the invaded and uninvaded zones. This is true not only for a particular frequency, but it is true also for a wide range of frequencies, it being kept in mind that the low frequencies are particularly much more useful to locate the diameter of the invaded zone. On the basis of the invaded zone properties, corrections may be made to the measured receiver voltages made at high frequencies using precomputed response functions.

ADDITIONAL STEPS IN OBTAINING DATA

Figure 9:
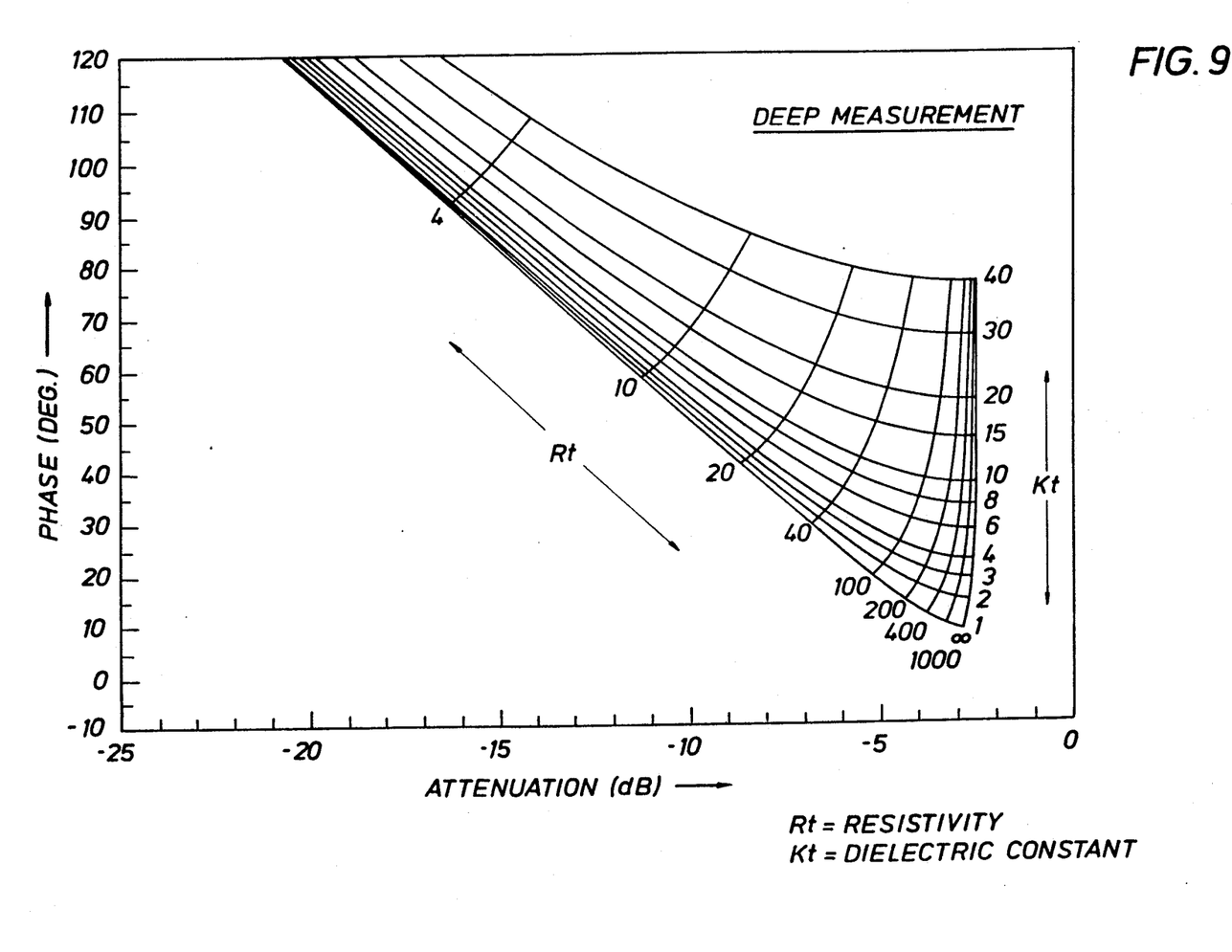
FIG. 9 shows a computed chart for determing dielectric constant.

In a typical situation, pulses are generated for transmission upwardly in the formation and downwardly in the formation, both at short and long spacings. This requires the four transmitter antennas as illustrated. The frequency is likewise shifted from a first to a second frequency, all this to obtain data over a range of frequencies and indeed, over many frequencies. This is performed in a time period sufficiently close that it more or less correspondents to a single depth in view of the repetitivity of and which measurements are made. Each signal received by the two respective receivers is processed to perform an invasion correction of the two quadrature components. The two quadrature components from each receiver can be analyzed and reduced to a relative phase-shift and a relative amplitude (or attenuation) of the signal between the receivers. These two measurements may now be related to the resistivity and dielectric properties of rock adjacent the receiver antennas, as is shown in FIG. 9. Since the geometry or spacing of the transmitter and receiver coils is fixed, the propagation constant through the formation can be determined as a function of frequency. The low frequency data determines the resistivity contrast and invasion diameter as mentioned above. The high frequency data combines these results to enable determination of dielectric constant properties of the formation. Once the dielectric constant property can be determined, the next step is to determine various constituents which are in the formation and which have an impact on the dielectric constant. Thus, potential hydrocarbon in the formation can be measured at that juncture, based upon additional information on rock properties available to a log analyst or geologist. It is a further benefit of this invention that the dielectric constant may be determined at several frequencies (since for rocks this so called constant is actually dependent on frequency) and valuable rock properties deduced from them.

Attention is now directed to FIG. 5 of the drawings for description of the antenna support system and more particularly the means and method for mounting the several antennas along the sonde. As a fundamental premise, there are several modes of propagation around the borehole which is presumed to be a perfect cylinder for purposes of setting out the present problem. It will pass through multiple beds of rock having different electrical properties. It is important that the logging tool respond only to the electromagnetic energy which travels approximately as a plane wave through the rock in a direction parallel to the axis of the borehole. This desirable propagation pathway enables the electromagnetic wave to respond to the properties of the adjacent formations assuming that the formation is sufficiently thick for resolution by the antenna spacing set forth herein. There are however, regrettable additional modes of propagation. For one, the borehole is assumed to be a cylindrical surface and it is surrounded by another cylindrical surface which is defined by the invaded borehole fluid in the formation. The ideal is an azimuthal electric field. This however is desired notwithstanding the fact that the antenna must cover a frequency range of 200 fold, that is 1 to 200 megahertz. Moreover, additional cylindrical members are defined in the borehole including the outer skin or surface of the sonde. The sonde also includes a central member which will be defined as the support mandrel hereinafter. Among other things, the mandrel supports the several antennas which have the form of solenoid coils. Thus, the mandrel is another factor involved. In sum, the central mandrel, the spaced antenna coils, the sleeve of the sonde, the borehole fluid, the borehole wall, and the invaded cylindrical zone all collectively form a type of coaxial transmission line. The magnetic field in this mode is azimuthal, that is it is orthogonal to the desired propagation mode. This forms an orthogonal wave which travels at a different velocity and subject to different attenuation factors. By reciprocity, such an unwanted spurious transmitted signal will provide excitation in the undesired mode at the receiving antenna. This forms an erroneous signal superimposed on the receiving antenna output. The complexities of the geometry just mentioned preclude data interpretation which overcomes erroneous constituents. Thus, the undesired radiation mode will contribute erroneous information, and this mode of transmission must be suppressed.

Suppression is not so easily accomplished in providing a broad frequency range antenna system capable of handling about 1 to about 200 megahertz. An example of the unwanted field is shown in FIG. 5 of the drawings where the field flux lines 73 are illustrated at various locations along the sonde. Radiation in these patterns is undesirable. Additionally, there will be a desirable magnetic field formed by the coils 74 which is the dual of the electric fields represented in FIG. 5 namely that which is labelled "E" in the parasitic mode is replaced by the "H" or magnetic field in the desired mode. Moreover, the desirable fields, superimposed by undesirable spurious fields, are subject to erroneous data at the receiver antennas as a result of this parasitic field pattern exemplified at 73 in FIG. 5 of the drawings.

The simplified representation of FIG. 5 sets out certain components which create the coaxial arrangement mentioned which functions as a type of coaxial transmission line. Briefly, the 11 has been incorporated to identify the outer sleeve of the sonde which encloses the antenna coils. The coils 74 can be any of the transmitting or receiving antennas mentioned above. It is connected with a coil feed cable 75 which is typically supported in a surrounding structural mandrel (not shown for sake of clarity) which extends internally of the outer housing or shell 11 of the sonde. Moreover, the idealized cylindrical borehole is also illustrated. In any case, the electric field which is created at 73 is an undesirable radiation which creates potentially undesirable output signals.

It has been discovered that a shielded loop antenna construction is best used for the present apparatus. More particularly, the shielded loop antenna which otherwise finds use in direction finding systems is preferred so that a multiturn solenoid construction is defined. External electrical dipoles formed along the axis of the solenoid are thus suppressed. This is assisted by connecting all the parallel turns together with an external shorting bar. While this might leave a transverse electrical dipole across the gap in the interrupted shield, that can be suppressed by offsetting the gap at alternate locations in a multiple turn construction. Thus, FIG. 6 shows the preferred construction of an antenna which is formed of N turns which are in equally spaced parallel planes. The topmost turn 78 is shown with the gap located at 79, and that gap is preferably located offset from the gap 80 in the adjacent turn. N may be in the range 3-10 turns, depending on the desired frequency response and gain. In any event, each turn is parallel to the adjacent turn. Since it is coaxial cable, it is provided with a nominal impedance which is typically two times the impedance loaded on the line.

There is an internal grounding strap identified at 81. The grounding strap 81 can be a fixed independent metal member which spans most if not all of the N turns. This maintains each turn at a common ground potential and thus helps suppress parasitic field formation. As a practical matter, the antenna shown in FIG. 6 must also include a balun connection 82 with a magnetic core 83 enclosed in metal shield 84 and further includes connection of the feed line 81 to enclosure 84 which is a ground connection and hence, antenna grounding is achieved through this mechanism. The antenna connects with a coaxial feed line having a characteristic impedance of one half of that of the coaxial cable making up the multiple turn antenna coil. The line is thus included for connection to the transmitting and receiving circuitry shown in FIG. 2 of the drawings. As will be understood, the antenna shown in FIG. 6 is installed on the inside of the sonde, and it is also supported on the central mandrel through the equipment. Going now to FIG. 7, this mandrel 88 is shown supporting two or more of the antennas spaced along its length. Each antenna is provided with its appropriate balun transformer and feed line. More importantly, the central mandrel 88 is centered within the sleeve which defines the outer housing of the sonde. This sleeve or housing 90 is made of a special material as will be described. The various antenna elements are spaced along the sleeve. For instance, the receiving antennas are illustrated at 20 and 21 consistent with other drawings of this disclosure. They are supported on the mandrel 88 as mentioned. It is desirable to separate and isolate the transmitter antennas to suppress the spurious unwanted parasitic radiation formed by them. A resistive disk 91 is supported on the mandrel spanning the full diameter of the interior of the outer shell or housing 90, and the disk is duplicated at certain locations particularly to isolate and quarantine spurious radiation patterns formed by the transmitter antennas. The central mandrel 88 constitutes a common zero potential metallic support (the mandrel) for the several antennas. The mandrel passes through the various coils and supports the various transmission lines for the several antenna coils. Admittedly, there is some modest loss due to the cross sectional area of the coil which is blocked by the conductive mandrel. However, the use of the common grounding bar yields a desirable antenna array properly supported in the housing, with accurately located coil positions.

Assume that long spurious electrical dipoles induce currents which flow along a coaxial transmission path which is the central metal mandrel while the fluids surrounding the housing serves as a return path. The several resistive disks serve as grounding paths and thereby bypass and dissipate such currents. The disks may be made of resistive material, i.e. material which has a bulk resistivity that is intermediate between metal conductors and insulators. The shell or housing is made in the same fashion. For instance, one suitable housing material is a woven glass fiber sleeve which is impregnated with epoxy composition. Some and perhaps many of the fibers which make up the sleeve are made of conductive carbon or graphite or other materials which serve as electrical conductors. The epoxy material can be impregnated with carbon powder to create a conductive pathway. In any case, a suitably controlled conductive pathway is defined and this helps suppress the undesired electric currents induced by the parasitic fields by absorbing them rather than simply reflecting the currents as would a higher or lower resistivity material. Carbon based materials have bulk resistivities in the range of 0.01 to 1 ohm-meters. In general terms, the use of the somewhat conductive shell or housing along with the spaced resistive disks has only a modest impact on the desired mode of tool operation.

While the foregoing is directed to the preferred embodiment, the scope is determined by the claims which follow.

What is claimed is:

1. A method of conducting invaded formation investigations to determine resistivity or dielectric constant properties near a well borehole, the method comprising the steps of:
   (a) transmitting, from a transmitter antenna to a receiver antenna on a sonde in a well borehole discrete emitted signal pulses having at least two separate selected frequency contents between 1 MHz and 10 MHz to form a plurality of low frequency received signals;
   (b) evaluating said plurality of low frequency received signals to determine the radial diameter of the formation invaded by well drilling fluids as indicated for formation resistivity contrast in invaded zone and non-invaded zone resistivity;
   (c) transmitting, from a transmitter antenna to a receiver antenna on the sonde in the well borehole, a plurality of discrete signals each of which is at higher frequencies in the range of 10 MHz to 200 MHz to form a plurality of received higher frequency signals; and
   (d) with values of resistivity provided in prior steps, determining from said plurality of higher frequency received signals formation dielectric constant values at said plurality of discrete higher frequencies.

2. The method of claim 1 wherein the step of determining the radial diameter of the formation invaded by well drilling fluids includes transmitting from the transmitter antenna signals at frequencies below about 10 MHz selected to provide a phase shift as a function of change in formation resistivity.

3. The method of claim 2 wherein a predetermined tornado chart provides invaded formation diameter.

4. The method of claim 1 wherein the invaded formation is measured in diameter by change in resistivity.

5. The method of claim 1 including the step of transmitting multiple signals from the transmitter antenna wherein the multiple signals are at spaced frequencies across a frequency spectrum of up to about 200 MHz.

6. The method of claim 1 including the step of transmitting from the transmitter antenna pluses at frequencies which differ by a specified ratio and which are in the range of about 1 to about 200 MHz.

7. The method of claim 1 including the step of transmitting from a first transmitter antenna, and subsequently transmitting from a second transmitter antenna wherein the two transmitter antennas are located above and below the receiver antenna on the sonde so that the transmitted signals travel along paths through the formations adjacent the well borehole in opposite directions.

8. The method of claim 1 including the step of transmitting from a first transmitter antenna and then from a second transmitter antenna to the receiving antenna on the sonde wherein the first and second transmitting antennas are spaced at different distances from the receiving antenna.

9. The method of claim 1 including the step of receiving the emitted signal at the receiver antenna and processing the received signal to separate quadrature components therefrom representing the resistive and reactive responses of the formations adjacent to the well borehole.

10. The method of claim 9 wherein the received signal is resolved by subtracting therefrom a selected frequency signal at a first phase relationship, and at a phase relationship shifted by 90°.

* * * * *